(12) United States Patent
Hasegawa

(10) Patent No.: US 7,776,477 B2
(45) Date of Patent: *Aug. 17, 2010

(54) FUEL CELL WITH NOVEL REACTION LAYER

(75) Inventor: Norifumi Hasegawa, Tokyo (JP)

(73) Assignee: KabushikiKaisha Eqous Research (JP)

( * ) Notice: Subject to any disclaimer, the term of this patent is extended or adjusted under 35 U.S.C. 154(b) by 231 days.

This patent is subject to a terminal disclaimer.

(21) Appl. No.: 11/587,982

(22) PCT Filed: Aug. 5, 2005

(86) PCT No.: PCT/JP2005/014442

§ 371 (c)(1),
(2), (4) Date: Nov. 26, 2007

(87) PCT Pub. No.: WO2006/016536

PCT Pub. Date: Feb. 16, 2006

(65) Prior Publication Data

US 2008/0206625 A1    Aug. 28, 2008

(30) Foreign Application Priority Data

Aug. 9, 2004 (JP) .............................. 2004-231861
Aug. 9, 2004 (JP) .............................. 2004-231862

(51) Int. Cl.
*H01M 4/58* (2010.01)
*H01B 1/04* (2006.01)
*H01B 1/00* (2006.01)
*B01D 11/00* (2006.01)

(52) U.S. Cl. ............... 429/232; 252/502; 252/500; 423/40

(58) Field of Classification Search .................. None
See application file for complete search history.

(56) References Cited

U.S. PATENT DOCUMENTS

| 4,642,664 | A | 2/1987 | Goldberg et al. ............... 257/1 |
| 4,725,422 | A | 2/1988 | Miyabayashi et al. ... 423/445 R |
| 4,731,705 | A | 3/1988 | Velasco et al. ............... 361/433 |
| 4,804,592 | A | 2/1989 | Vanderborgh et al. ......... 429/33 |
| 4,911,803 | A | 3/1990 | Kunz ......................... 205/764 |
| 5,573,648 | A | 11/1996 | Shen et al. .................. 204/412 |
| 6,187,157 | B1 | 2/2001 | Chen et al. .................. 204/296 |
| 2002/0192538 | A1 | 12/2002 | Tanahashi et al. ............. 429/44 |
| 2003/0108785 | A1* | 6/2003 | Wu et al. ...................... 429/44 |
| 2004/0115516 | A1* | 6/2004 | Miyake et al. ................ 429/42 |

FOREIGN PATENT DOCUMENTS

JP   2003-200052   7/2003
JP   2004-185863   7/2004

\* cited by examiner

*Primary Examiner*—Melvin C Mayes
*Assistant Examiner*—Sheng Han
(74) *Attorney, Agent, or Firm*—Bacon & Thomas, PLLC

(57) ABSTRACT

A fuel cell includes a reaction layer composed of a catalyst carrier, formed of a compound having inorganic electron conductor units and inorganic proton conductor units in its molecular structure, and a catalyst supported on the catalyst carrier.

19 Claims, 15 Drawing Sheets

FUEL CELL WITH NOVEL REACTION LAYER

CROSS-REFERENCE TO RELATED APPLICATIONS

Related subject matter is disclosed and claimed in U.S. application Ser. No. 10/509,752 filed Sep. 30, 2004 and in U.S. application Ser. No. 10/667,974, filed Sep. 23, 2003.

FIELD OF THE INVENTION

The present invention relates to fuel cells. More particularly, the present invention relates to improvement of the reaction layer of a fuel cell.

BACKGROUND OF THE INVENTION

The reaction layer of a fuel cell is formed between a proton exchange membrane and a backing layer and supports a catalyst for accelerating an electrochemical reaction. In the reaction layer, on an air cathode side for example, protons passing through the proton exchange membrane and electrons transferred to the air cathode are conducted to the catalyst, for reaction between the oxygen and protons diffused onto the catalyst. Thus, the reaction layer should exhibit both proton conduction and electron conduction in order to minimize the transfer loss of oxygen, protons and electrons. To this end, a mixture of poly electrolytes having catalysts supported on their surfaces, e.g. carbon particles (exhibiting electron conduction) and Nafion (trade name, manufactured by E.I du Pont de Nemours) which exhibits ionic conduction have been used in a fuel cell (see FIG. 1B).

However, if a material having ionic conduction and a material having electronic conduction are used together, it is difficult to mix them so as to achieve complete uniformity. As a result, protons and electrons cannot be uniformly transferred to all catalyst particles.

To solve the foregoing problem, there have been proposed a variety of mixed conductors for use as carriers designed for supporting catalysts, which carriers exhibit both ionic conduction and electron conduction using one material (A carrier designed for supporting a catalyst will be hereinafter referred to as a "catalyst-supporting carrier").

Organic catalyst-supporting carriers are disclosed in JP2001-202971A, JP2001-110428A, JP2003-68321A and JP2002-536787A. However, since the organic catalyst-supporting carriers are made of organic materials, they present many problems in terms of durability and heat resistance which are obstacles to practical use.

In addition, inorganic catalyst-supporting carriers which conduct electrons and oxygen ions are disclosed in JP1998-255832A, JP1999-335165A, JP2000-251533A, and JP2000-18811A. However, the inorganic catalyst-supporting carriers which transfer electrons and oxygen ions have high operating temperatures (about 800° C.). Due to such high operating temperatures, these inorganic catalyst-supporting carriers are inappropriate for use in small-sized fuel cells, for example in vehicles and cellular phones.

Prior to the present invention, no catalyst-supporting carrier exhibiting both proton conduction and electron conduction had been developed which operates within a moderate temperature range (room temperature to 200° C.) and which can be used in fuel cells.

SUMMARY OF THE INVENTION

Accordingly, it is an object of the present invention to solve the foregoing problems by providing a novel inorganic catalyst-supporting carrier, a supported metal catalyst wherein the support is the novel carrier and a fuel cell reaction layer employing the supported metal catalyst, as well as a fuel cell that incorporates such a reaction layer.

Thus, the present invention provides a fuel cell comprising a reaction layer substantially composed of a catalyst-supporting carrier, in the form of a compound of an inorganic electron conductor and an inorganic proton conductor, bound together in an inorganic polymeric molecular structure, and a catalyst supported thereon.

Being a single compound, i.e. having a single molecular structure, this catalyst-supporting carrier (or "mixed conductor") as a whole provides both electron conduction and proton conduction while the electron conductors and the proton conductors thereof are strongly bonded together in a single molecular structure which is substantially insoluble in water.

Preferably, the electron conductor is obtained by carbonizing an organic material.

The supported metal catalyst includes a carrier and, supported thereon, a metal catalyst, such as platinum or a platinum alloy, suitable for a fuel cell reaction. The term "supported metal catalyst" as used herein refers to any suitable catalyst supported on the above-described catalyst-supporting carrier. In a supported metal catalyst (platinum or other catalyst suitable for a fuel cell reaction) of the present invention, as shown in FIG. 1A, electrons, protons, and oxygen are supplied to all the supported catalyst particles. This permits full utilization of all the catalyst. If such a supported metal catalyst is used to form a reaction layer for a fuel cell, the efficiency of the catalyst and thus that of the fuel cell are improved.

In contrast, in a conventional fuel cell reaction layer of a type currently in use that employs both (1) a supported metal catalyst composed of an electron conductive carrier (such as carbon particles) that supports a catalyst and (2) an ion exchange resin (such as Nafion), as shown in FIG. 1B, the ion exchange resin may be prevented from coming into contact with the catalyst supported in the recesses in the electron conductive carrier. Since no proton is supplied to the catalyst in such recesses, it does not contribute to the fuel cell reaction.

Gas travels in an ion exchange resin at a speed far slower than in gas phase. Accordingly, an excessive coating of an ion exchange resin blocks gas supply and thus adversely affects the performance of the fuel cell. Furthermore, ion exchange resins experience dimensional change during a drying-wetting cycle. This change in dimensions may cause some catalysts to separate from the carrier.

The inorganic electron conductor may be of the type having a main chain containing one of or both of carbon-carbon double bonds and carbon-carbon triple bonds, the main chain contributing to the electron conduction function, as shown in FIGS. 2 and 3. Alternatively, a type which transfers electrons through a side chain may be used.

The preferred inorganic electron conductor is that obtained by carbonizing an organic compound having a π bond. Examples of the organic compounds having a π bond include aliphatic hydrocarbons, aromatic hydrocarbons and derivatives thereof. At least one such compound is used as the organic compound to be carbonized. Typical examples of π bond organic compounds include polyacetylene, resorcinol, phenol, phenylphenol, polyaniline, polypyrrole, polythiophene, phenylphosphonic acid, phenylsilane alkoxide, pyrogallol, and dihydroxybiphenyl.

Further, the inorganic material used for the electron conductor can be a carbonaceous material such as graphite or a carbon nanotube or a metallic material containing a metal such as gold, palladium, platinum, magnesium, lithium or titanium, or an alloy thereof.

The inorganic proton conductor may be a phosphorus-containing compound, a sulfur-containing compound, carbonic acid, boric acid, or inorganic solid-state acid, particularly at least one aphosphorus-containing acid, such as phosphoric acid, or a phosphoric acid ester, sulfuric acid, a sulfuric acid ester, tungsten oxide hydroxide, rhenium oxide hydroxide, silicon oxide, tin oxide, zirconia oxide, tungstophosphoric acid, and tungstosilicic acid.

According to the present invention, inorganic electron-conducting units and inorganic proton-conducting units may together form the molecular structure of a single compound (inorganic polymer) in which the electron conductor and the proton conductor are strongly bonded together. As a result, when the catalyst-supporting carrier of the present invention is immersed in water, hardly any proton conductors are desorbed. Additionally, the mixed conductor, as a whole, provides both electron conduction and proton conduction.

The foregoing compound maybe formed (i.e., the electron conductors may be fixed to the proton conductors) by covalent bonding in an inorganic, polymeric molecular structure. Alternatively, the bonding may be by intercalation or inclusion. However, depending on production process conditions, these different forms may possibly be mixed.

The type of bonding, chemical (covalent bonding) or physical (intercalation or inclusion) is determined by the types of the materials serving as the electron conductor and the proton conductor. For example, if the electron conductor is an inorganic material obtained by carbonizing an organic material, the bonding may be mainly covalent bonding. If the electron conductor is a metallic material and the proton conductor is an inorganic material, such as an oxide, for example, the two different conductors can be fixed to each other by covalent bonding or by inclusion.

Covalent bonding of an electron conductor and a proton conductor in a crystalline inorganic, polymeric molecular structure is illustrated in FIGS. 2, 3, 4 and 5. Since the covalently bonded electron conductors 1 or 3 and the proton conductors 2 are in close proximity, both the electron conductors and the proton conductors contact the catalyst particles supported thereon (e.g., platinum) at the nano level as shown in FIG. 1A. Accordingly, it is possible to supply electrons and protons necessary for a catalytic reaction to the catalyst in proper quantities.

The catalyst-supporting carrier is formed as follows.

First, a high molecular weight precursor is formed by polymerizing an organic compound having a π bond together with a proton conducting material. In this high molecular weight polymer precursor, the carbon atoms of the organic compound are believed to form electron conducting main chains having a π bond and covalent bonds with the proton conductors which form bridges between the carbon units of the carbon main chain of the electron conductor. By incorporating the proton conductor into the main chain of the inorganic polymer in sufficient quantities, the proton conductors are sufficiently close to provide proton conduction therebetween.

As shown in FIGS. 2, 3, 4 and 5 the mixed conductor carrier of the present invention may be in the form of an inorganic polymer wherein the molecular structure of the polymer includes both electron conducting portions (groups or units) and proton conducting portions (groups or units).

Alternatively, a precursor may be obtained by dispersing a proton conductor in a polymer of an organic compound having a π bond.

In a case where degree of polymerization is low, the result is dispersion of the proton conductor in the polymerized organic compound. Where the degree of polymerization is not sufficient, the result is a precursor containing both proton conductor covalent bonding to an organic compound forming an electronic conductor and dispersed proton conductors, isolated from the covalently bonded proton conductor.

When one of the precursors described above is pyrolyzed in an inert atmosphere, the organic compound is carbonized and thereby converted into an inorganic material providing electron conduction.

Because the proton conductor is stably fixed within electron conducting carbon skeletons, proton conduction is ensured. It is considered that the proton conduction is attained by arrangement of the proton conductors in close proximity to each other. As shown in FIGS. 1A, 1B and 2, where the proton conductors bridge the carbon groups (or "units"), the positions of the proton conductors are fixed, thereby ensuring the proton conduction by the interaction between the proton conductors.

If the proton conductors are released from the carbon skeletons or if the proton conductors are not bound to the carbon skeletons in conversion of the precursor, it is believed that the proton conductors become intercalated into the carbon main chain or included within the mesh structure formed by the carbon main chain. In any case, it is believed that proton conduction can be ensured as long as the proton conductors are in close proximity.

As can be seen, since the proton conductors are integrated into a compound and are bonded, intercalated or included between the carbon skeletons, the proton conductors are fixed within the catalyst support (mixed conductor) (do not "float"). Thus, even if the mixed conductor is used within an environment where water is present, the proton conductor is not dissolved out by the water. The mixed conductor as a whole provides both electron conduction and proton conduction and the proton conduction is not significantly reduced by exposure to water.

Preferably, the precursor is heated or pressure-heated prior to pyrolyzing. Such heating or pressure-heating of the precursor will result in an increased phosphorus content after pyrolyzation. The method employed for heating or pressure-heating the precursor is not specifically limited; rather, any commonly employed method may be utilized.

The precursor is heated to a boil and the steam generated is condensed by cooling and returned to the reaction vessel. Refluxing is provided by a cooled condenser preferably installed in association with the reaction vessel. Such refluxing permits the precursor to be heated at atmospheric pressure. The specific heating temperature and heating time are selected to suit the characteristics of the precursor.

The method employed for pressure-heating the precursor is not specifically limited; however, use of an autoclave is preferred from the standpoint of workability and other related factors. The pressure applied to the precursor during heating may be atmospheric pressure or an elevated pressure to suit the characteristics of the precursor.

Examples of the organic compound having a π bond include unsaturated aliphatic hydrocarbons and aromatic hydrocarbons. More specifically, at least one of polyacetylene, resorcinol, phenol, phenylphenol, polyaniline, polypyrrole, polythiophene, phenylphosphonic acid, phenylsilane alkoxide, pyrogallol, and dihydroxybiphenyl can be selected as the organic compound having a π bond.

Suitable proton conducting materials include phosphorus-containing compounds, sulfur-containing compounds, carbonic acid, boric acid, and inorganic solid-state acids. Examples of the phosphorus-containing compounds include phosphoric acid and examples of the sulfur-containing compounds include sulfuric acid and sulfonic acid. Further, an inorganic proton conducting material can be produced using a derivative of one of these compounds as a starting material. Preferably, the proton conducting material is at least one of a phosphorus-containing compound, phosphoric acid, phosphate ester, sulfuric acid, sulfate ester, sulfuric acid, tungsten oxide hydroxide, rhenium oxide hydroxide, silicon oxide, tin oxide, zirconia oxide, tungstophosphoric acid, and tungstosilicic acid.

To convert the organic compound in the precursor into organic units, it is preferable that the precursor is pyrolyzed in an inert atmosphere.

The inert atmosphere can be argon gas, nitrogen gas, helium gas or a vacuum. When the precursor is pyrolyzed in such an inert atmosphere, the organic component of the precursor is carbonized and thereby converted into an inorganic material. If the main chain of the organic component has a π bond, high electron conduction is ensured. Heating temperature and heating time are appropriately selected according to the characteristics of the precursor.

Simultaneously with or after heating, high energy in a form other than heat, such as plasma radiation, microwave radiation or ultrasonic radiation, can be applied to the precursor.

As described above, the catalyst-supporting carrier according to the present invention is made of inorganic materials and exhibits both an electron conducting function and a proton conducting function. In addition, even in a low temperature range close to a room temperature, the catalyst-supporting carrier functions properly. Further, even if exposed to water, the catalyst-supporting carrier retains both its electron conduction and its proton conduction.

Such a catalyst-supporting carrier is capable of supporting a metal (especially a noble or precious metal) having catalytic activity. The method for forming the metal catalyst on the carrier is not specifically limited, i.e. any known method may be used for the purpose of the present invention.

Thus, the mixed conductor is used as a carrier for supporting a metal to provide a supported metal catalyst, which is in turn used to form a reaction layer of a fuel cell unit. For example, the supported metal catalyst may be dispersed in water, alcohol, or any other appropriate medium to prepare a paste which is applied onto one side of the backing layer to form a reaction layer. Such a reaction layer, and the backing layer to which the reaction layer is applied, may be joined to each side of a proton exchange membrane (a Nafion membrane in this case) so as to provide a fuel cell unit or a unit cell constituent of a fuel cell. It is also possible to form a reaction layer by applying the paste to the exposed surface of the backing layer. PTFE, Nafion, and other suitable materials may be added as a binder to the paste.

Alternatively, the supported metal catalyst in the form of powder is hot pressed to form a reaction layer conforming to the intended shape of the electrode. Such reaction layers and a proton exchange membrane are laminated and hot pressed to form an integrally molded article in which the proton exchange membrane is interposed between the reaction layers. A backing layer may then be joined to the outside (exposed) surface of each reaction layer to fabricate a fuel cell unit.

Thus the present invention provides a supported metal catalyst comprising (1) a carrier that has a molecular structure formed of an inorganic electron conductor and that has an inorganic proton conductor incorporated therein and (2) a noble metal catalyst supported on the carrier. The carrier (catalyst support) of the present invention has an inorganic, polymeric molecular structure formed of electron conductor units with proton conductor units incorporated into chains in the molecular structure of the polymer by covalent bonding and/or by fixing the proton conductors within the polymeric electron conductor by inclusion and/or intercalation.

The present invention also provides a method for producing a supported metal catalyst comprising:

obtaining a high molecular weight precursor by mixing and polymerizing at least one carbon source selected from the group consisting of aliphatic hydrocarbons, aromatic hydrocarbons and derivatives of the aliphatic hydrocarbons and the aromatic hydrocarbons with a proton conducting material;

pyrolyzing the high molecular weight precursor to form a carrier;

coating the carrier with a noble metal catalyst to form a supported noble metal catalyst.

The at least one member selected from the group consisting of aliphatic hydrocarbons, aromatic hydrocarbons and/or derivatives thereof may first be polymerized and then mixed the proton conducting material and then pyrolyzed. In the method of the present invention, the carbon source mixed with the proton conducting material is preferably at least one member selected from the group consisting of polyacetylene, resorcinol, phenol, phenylphenol, polyaniline, polypyrrole, polythiophene, phenylphosphonic acid, phenylsilane alkoxide, pyrogallol, and dihydroxybiphenyl.

The proton conductor is preferably at least one member selected from the group consisting of phosphorus-containing compounds, sulfur-containing compounds, carboxylic acids, boric acid, and inorganic solid-state acids.

The heating for pyrolyzing the high molecular weight precursor may be at atmospheric pressure or at an elevated pressure.

DESCRIPTION OF THE PREFERRED EMBODIMENTS

The above-stated advantages of the supported metal catalyst for use in a fuel cell according to the present invention are illustrated by the following description of preferred embodiments, with reference to the drawings.

Figure 1A:
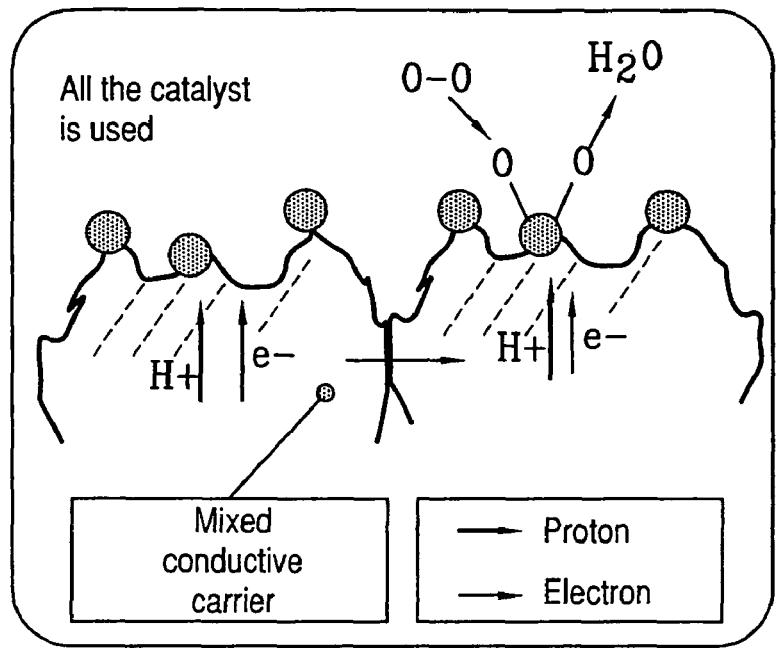
FIG. 1A is a schematic view of a catalyst-supporting carrier of the present invention, showing the manner in which the carrier supports a catalyst.
Figure 1B:
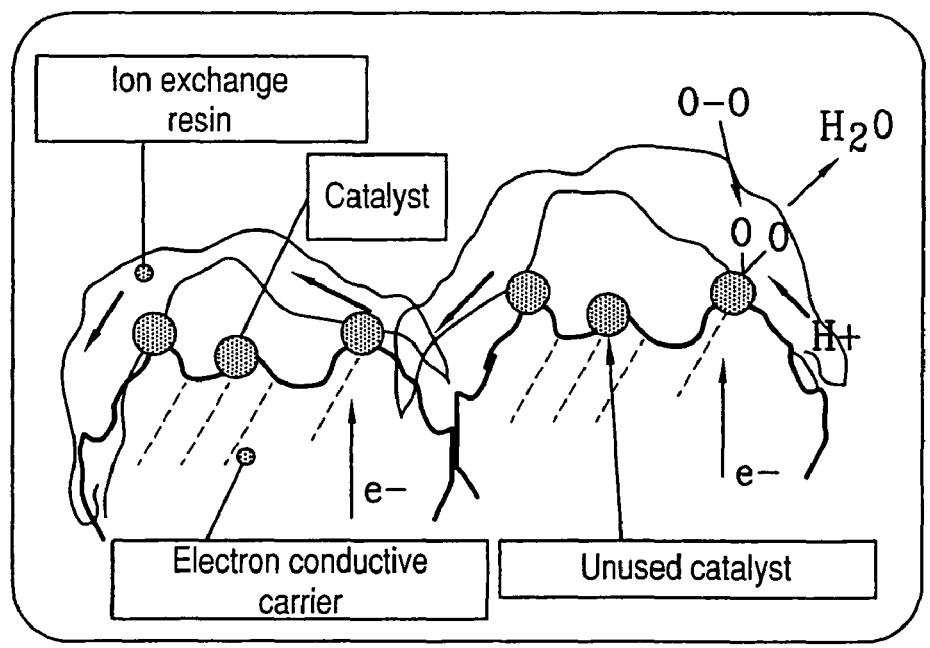
FIG. 1B shows the manner in which a conventional catalyst-supporting carrier supports a catalyst.
Figure 2:
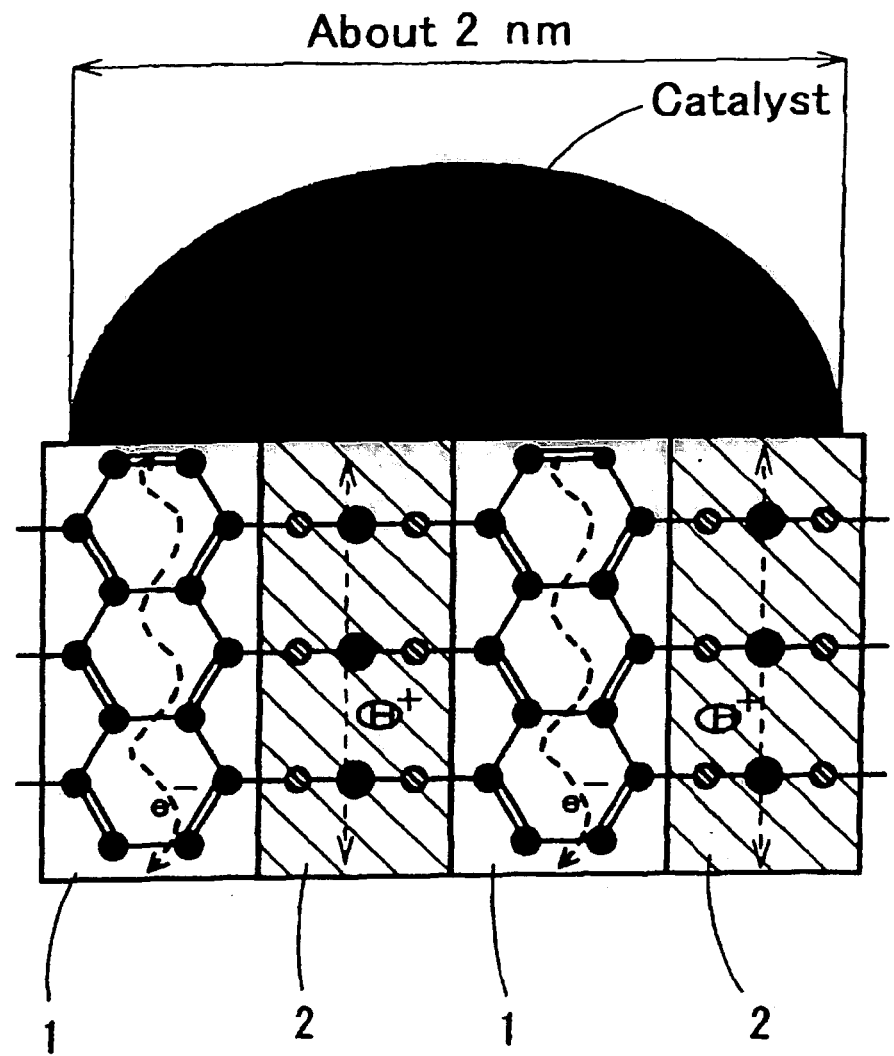
FIG. 2 illustrates the molecular structure of a catalyst-supporting carrier (inorganic polymer) according to the present invention.
Figure 3:
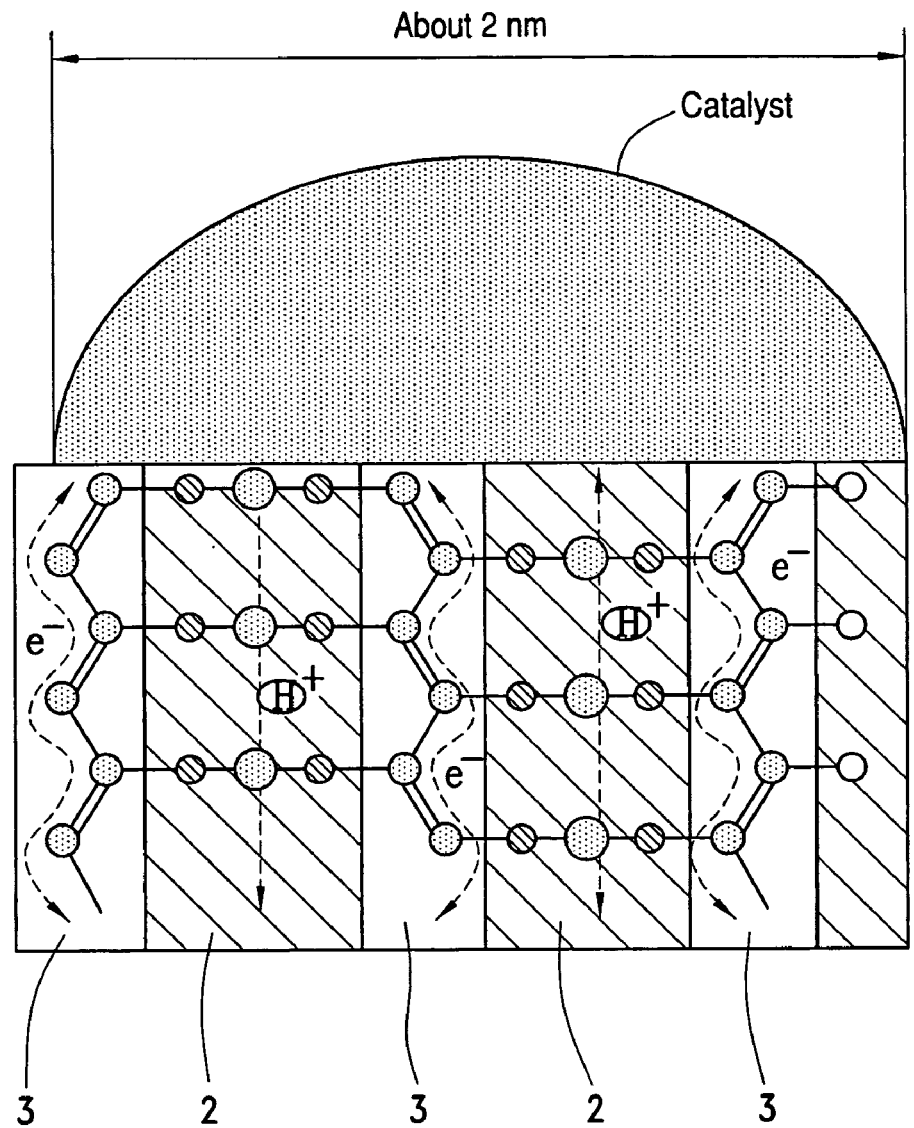
FIG. 3 illustrates another molecular structure of a catalyst-supporting carrier according to the present invention.
Figure 4:
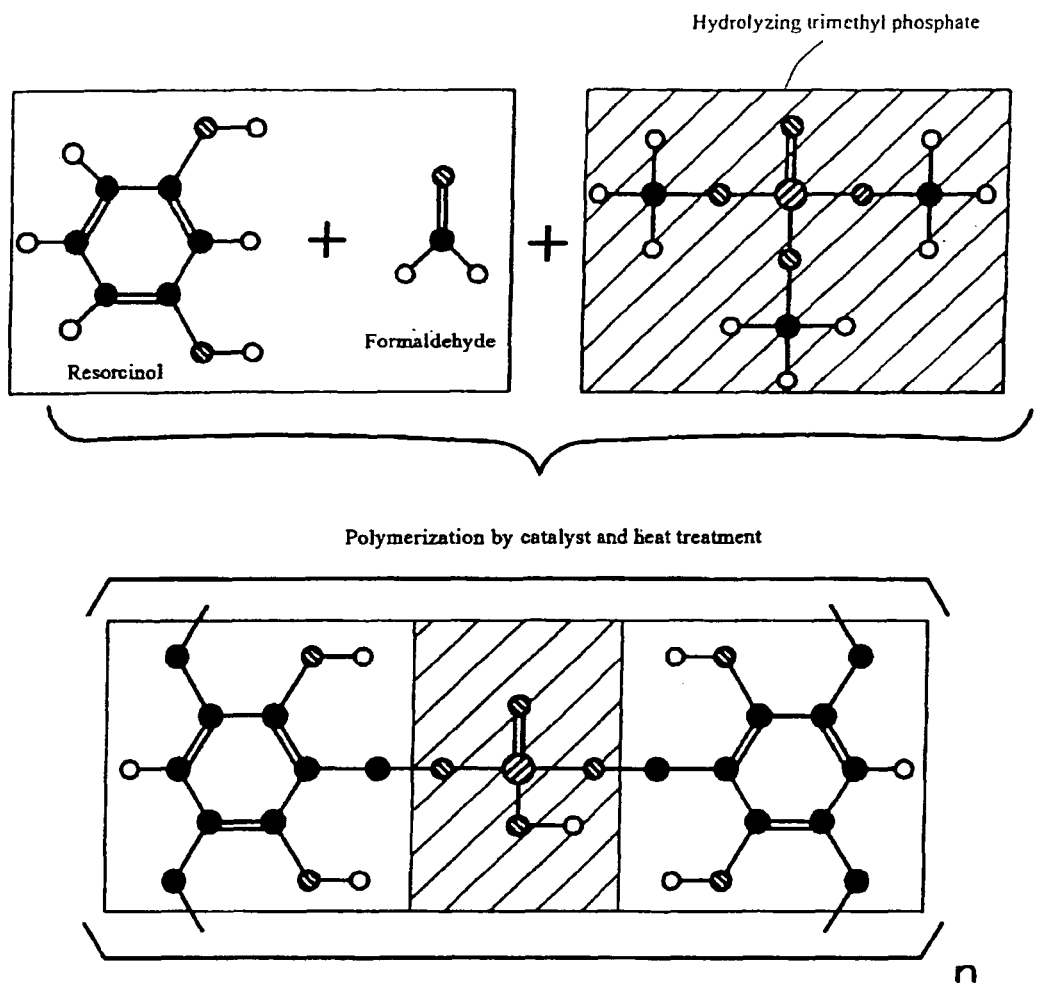
FIG. 4 illustrates formation of the polymeric molecular structure of a precursor.

First, a method for producing a supported metal catalyst in accordance with the following chemical reaction will be described with reference to FIGS. 3 and 4.

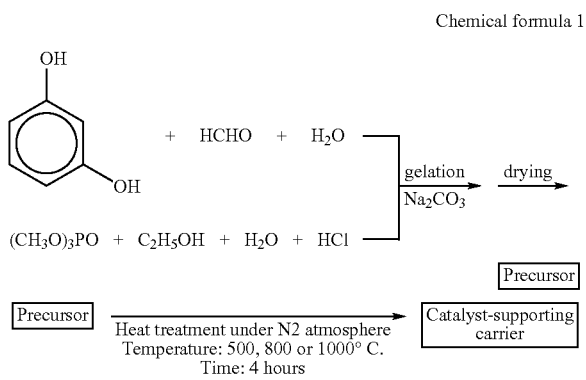

Chemical formula 1

Resorcinol (10 g) and formaldehyde (13 ml) are dissolved in water (40 ml), and a solution obtained by hydrolyzing trimethyl phosphate is added. The resultant solution is dehydrated and condensed with $Na_2CO_3$ as a catalyst to gelate the solution. This gel is dried at 120° C., thereby obtaining a precursor as shown in FIG. 4.

Figure 5:
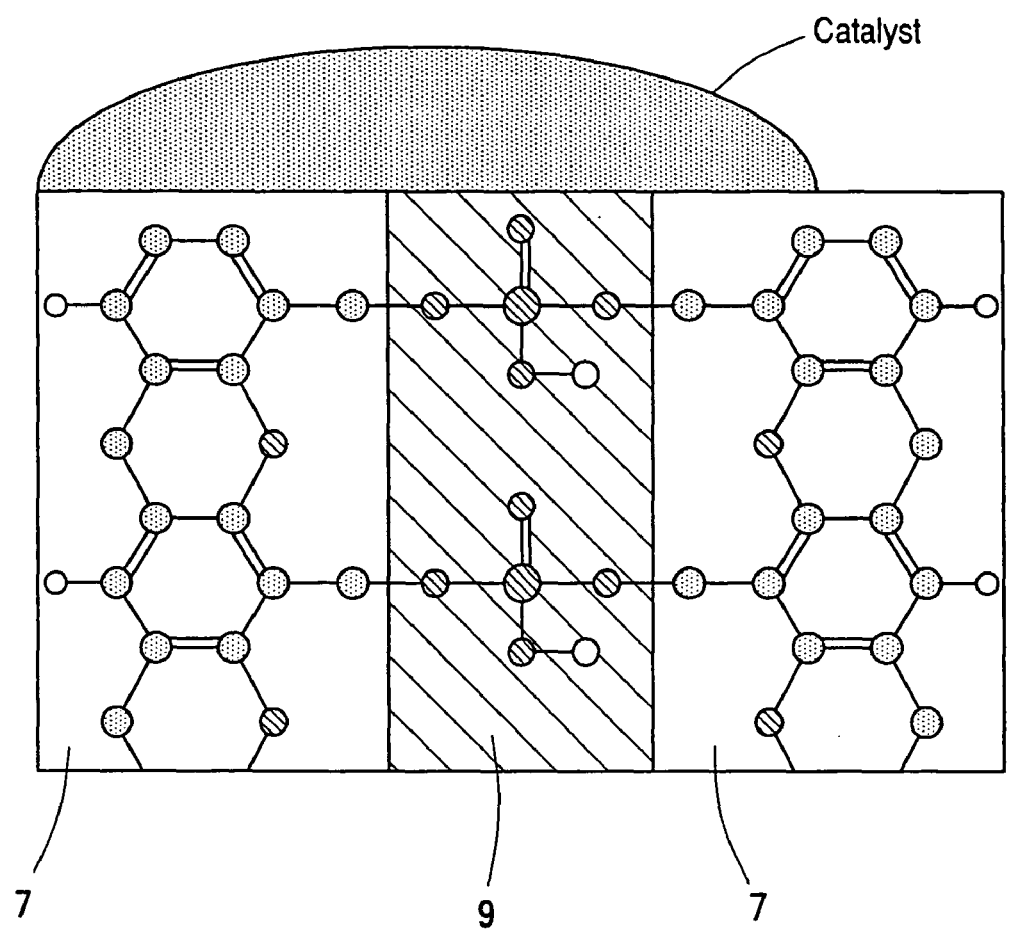
FIG. 5 illustrates yet another molecular structure of a catalyst-supporting carrier of an embodiment according to the present invention.

The thus obtained precursor is subjected to pyrolysis (at 500 to 1000° C.) in a nitrogen atmosphere to obtain a catalyst-supporting carrier. This catalyst-supporting carrier has electronic conductor phases (units) 7 of a graphite-like structure and proton conductor phases (units) 9 in the form of phosphoric acid groups arranged in an alternating alignment as shown in FIG. 5.

The catalyst-supporting carrier thus obtained is ground, pressure-formed into a plate, put between current collecting plates and a DC current is supplied to the plate-like mixed conductor. Specific resistance of each embodiment is obtained from a voltage at that time. Measurement was at room temperature.

|  | Example 1 | Example 2 | Example 3 |
| --- | --- | --- | --- |
| Heat treatment temperature | 500° C. | 800° C. | 1000° C. |
| Specific resistance ($\Omega \cdot cm$) | 138 | 0.35 | 0.13 |

The reason for the high specific resistance at a heating temperature of 500° C. is considered to be insufficient carbonization of the organic material.

The heating temperature and heating time are parameters that can be appropriately selected according to the structure and properties of the organic compound.

The specific resistance of each sample (Examples 1-3) was determined as follows:

1/specific resistance=conductivity=1/(resistance×geometrical surface area of sample/thickness), in which resistance=applied voltage/response current.

The proton conductivity and the electron conductivity (described below) are calculated in the same manner. To calculate the proton conductivity, a sample 11 is sandwiched between a material, such as Nafion membranes, that conduct protons but not electrons. To calculate the electron conductivity, a sample 11 is sandwiched between a material, such as copper, that conducts electrons but not protons.

Next, a proton conduction test will be described with reference to FIGS. 6 and 7.

Figure 6:
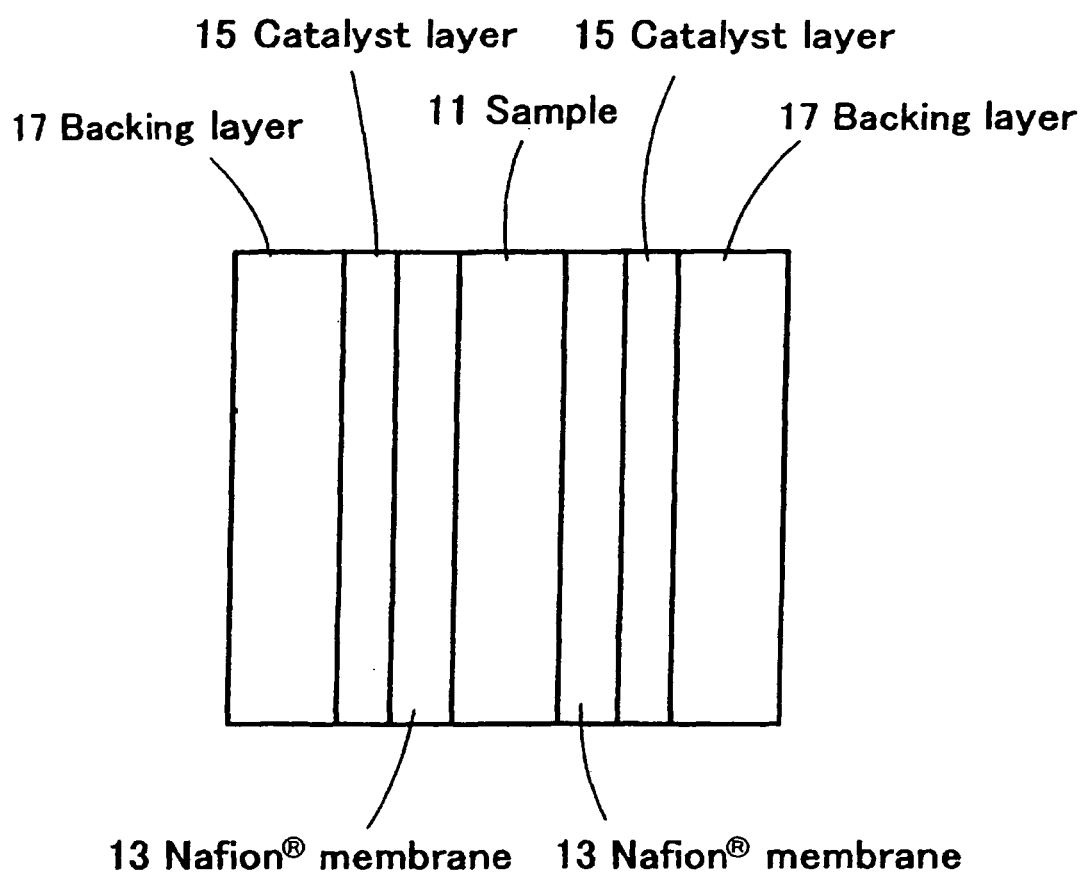
FIG. 6 is a schematic view of a holder for checking the proton conducting function of the catalyst-supporting carrier.

As shown in FIG. 6, a backing layer 17 consisting of a carbon cloth and catalyst layer 15 is attached to each of the samples 11 obtained in Examples 1 to 3. In the figure, the catalyst layer 15 is composed of carbon particles supporting a platinum catalyst and is equivalent to the structure of a reaction layer of a prior-art fuel cell. A Nafion membrane 13 transmits protons but blocks electrons.

The structure shown in FIG. 6 is put in a container, and nitrogen gas or hydrogen gas at a temperature of 60° C. and a relative humidity of 100% is introduced into the container. Monitoring of the voltage-current characteristic of the thus moisture-exposed structure over time is shown in FIG. 7.

Figure 7:
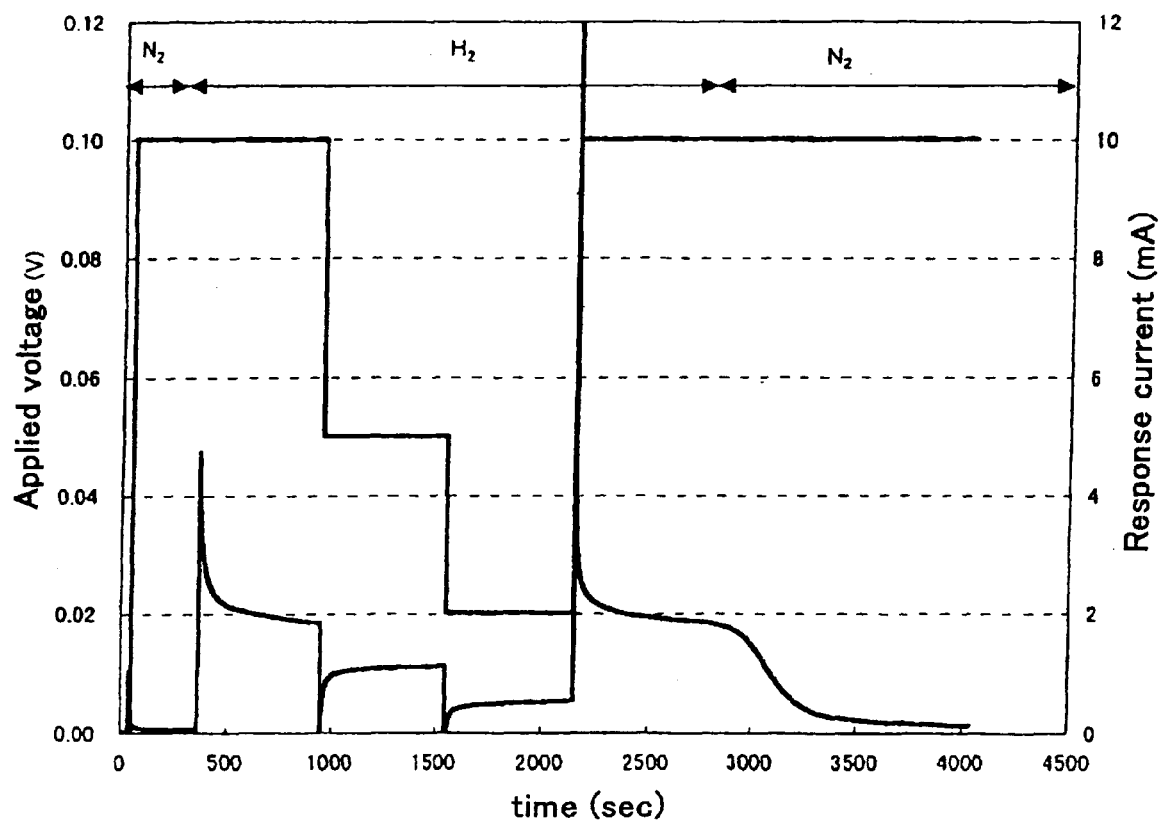
FIG. 7 is a graph of the current-voltage characteristics of the holder shown in FIG. 6.

As can be seen from FIG. 7, even if a voltage is supplied between the backing layers 17 while introducing the nitrogen gas, no current is carried. On the other hand, if hydrogen gas is introduced into the container, it can be seen that a current flows. This demonstrates that the sample 11 has proton conduction.

The proton conductivity of each sample is calculated as follows.

|  | Example 1 | Example 2 | Example 3 |
| --- | --- | --- | --- |
| Heat treatment temperature | 500° C. | 800° C. | 1000° C. |
| Proton conductivity (S/cm) | $2.6 \times 10^{-3}$ | $1.3 \times 10^{-3}$ | $7.3 \times 10^{-4}$ |

Further, as comparative examples, the proton conductivities of samples formed without addition of trimethyl phosphate were tested in the same manner and found to be as follows.

|  | Comparative Example 1 | Comparative Example 2 | Comparative Example 3 |
|---|---|---|---|
| Heat treatment temperature | 500° C. | 800° C. | 1000° C. |
| Proton conductivity (S/cm) | $1.0 \times 10^{-6}$ or less | $1.0 \times 10^{-6}$ or less | $1.0 \times 10^{-6}$ or less |

Comparison of the samples formed with addition of trimethyl phosphate with those formed without trimethyl phosphate, confirms proton conduction by phosphorus.

Figure 8:
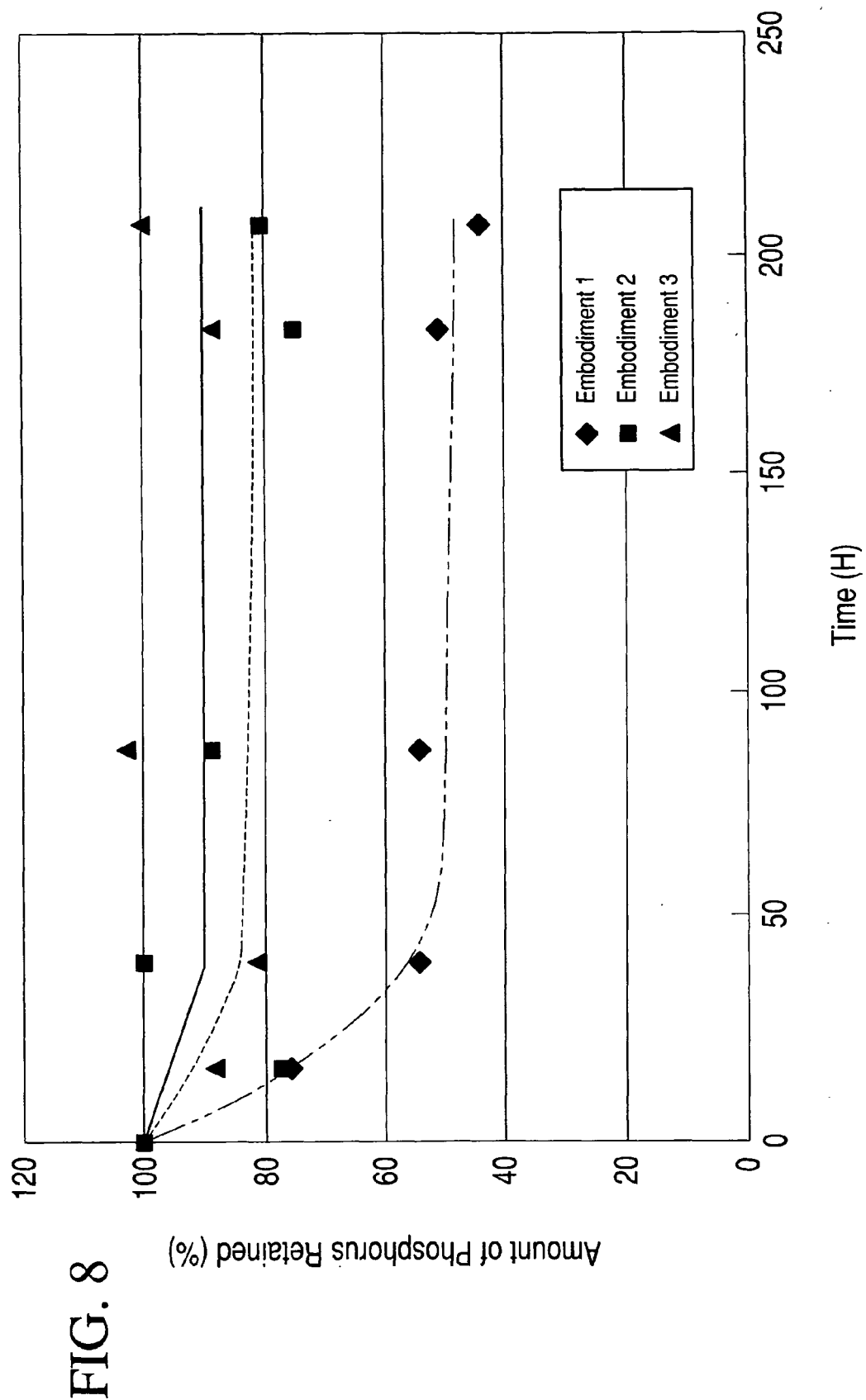
FIG. 8 is a graph showing change of the amount of phosphoric acid with time in the catalyst-supporting carrier of the present invention, immersed in pure water.

The relationship between immersion time and phosphorus retention for samples (0.1 g) of the respective examples immersed in 100 cc of pure water at room temperature is shown in FIG. 8.

In FIG. 8, the amount of phosphorus retained was measured by an EDX analyzer (model designation: EMAX240, manufactured by HORIBA Ltd.).

The results shown in FIG. 8 confirm that about 60% of phosphorus, about 80% of phosphorus, and about 90% of phosphorus (i.e., proton conduction) remain in the samples from examples 1, 2, and 3, respectively. This demonstrates that the catalyst-supporting carriers of the present invention maintain their proton conducting function even in a humid environment over a long period of time.

These catalyst-supporting carriers can be used for fuel cells, and are particularly useful as the reaction layers of fuel cells. Within the reaction layer is where oxygen or hydrogen supplied from the outside through the backing layers is ionized, and the reaction layer is normally arranged between the proton exchange membrane and the backing layer.

Examples of a method for producing a supported metal catalyst will next be described.

Each of the catalyst-supporting carriers produced above (Examples 1-3) is ground to powder by a ball mill or the like, and the resulting catalyst-supporting carriers in particulate form are used to support a platinum catalyst or other catalyst. The platinum catalyst may be supported on the catalyst-supporting carrier by any of the same methods conventionally used to support platinum on a carbon carrier to form a supported platinum catalyst, including use of the colloid method or impregnation.

The colloid method was performed as follows: A Pt colloidal solution was prepared from platinic chloride. To this colloidal solution was added the catalyst-supporting carrier in the form of powder. The carrier was then subjected to a reduction treatment to obtain a carrier with platinum supported thereon (Example 4). The supported platinum catalyst of Example 5 was obtained by changing the platinum concentration.

The impregnation method was performed as follows: The catalyst-supporting carrier was ground and added to a methanol solution of diamino platinum nitrite, which was then stirred and dried. Subsequently, the carrier was subjected to a reduction treatment to provide the supported platinum catalyst of Example 6.

The characteristics of the supported platinum catalysts of these examples are as follows:

|  | Example 4 | Example 5 | Example 6 |
|---|---|---|---|
| Density of supported platinum (wt %) | 30 | 50 | 30 |
| Platinum particle size (nm) | 5.1 | 5.1 | 3-6 |

The foregoing densities of supported platinum were measured by an EDX analyzer (model designation: EMAX240, manufactured by HORIBA Ltd.).

The foregoing particle sizes of platinum were measured by an XRD (model designation: XPM3, manufactured by Bruker AXS Inc.).

Figure 9:
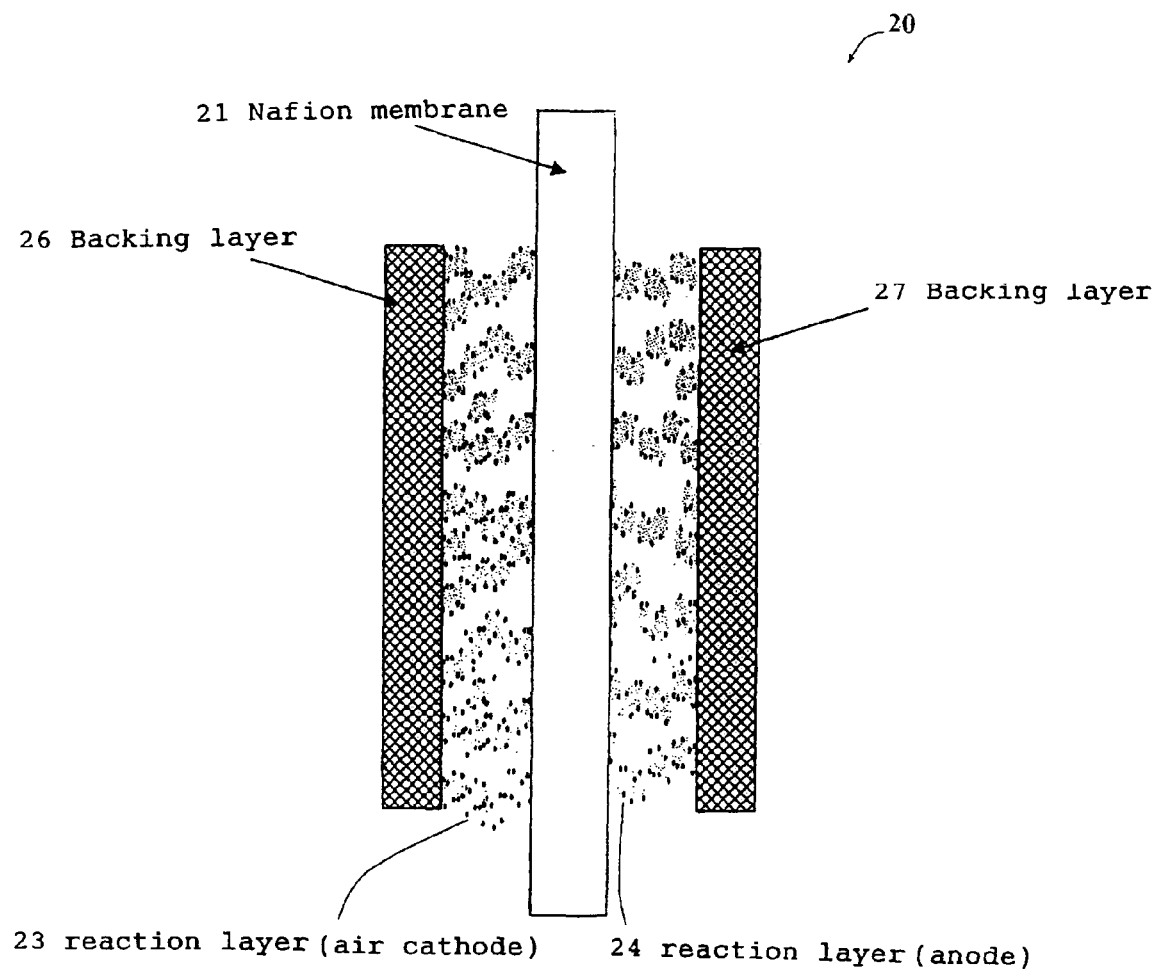
FIG. 9 is a cross-sectional view of a fuel cell with a reaction layer (on the air cathode side) composed of a metal-supporting catalyst according to one embodiment of the invention.

Next, a fuel cell 20 as shown in FIG. 9 was constructed from the supported platinum catalyst of Example 4. In particular, the supported platinum catalyst of Example 4 was dispersed in a mixture of pure water, a PTFE fluid dispersion, and alcohol, which was then applied onto a backing layer 26 made of carbon to provide a reaction layer (air cathode) 23. The amount of supported catalyst applied was varied to prepare three different reaction layers (Examples 7, 8, and 9). The reaction layer (the anode or counter electrode) was made by applying powdered carbon with supported platinum (of a density of 40 wt %) dispersed in a mixture of pure water and a Nafion solution onto a carbon backing layer 27. Subsequently, the backing layer 26 (coated with the reaction layer 23), the Nafion membrane 21, and the backing layer 27 (coated with the reaction layer 24) were laminated and joined by hot pressing to obtain the fuel cell 20 of FIG. 9.

In the embodiment of fuel cell 20 shown in FIG. 9, no proton conduction was included in the reaction layer on the air cathode side in order to provide the fuel cell of Comparative Example 4. Thus, powdered carbon with supported platinum (of a density of 40 wt %) was dispersed in a mixture of a PTFE fluid dispersion and alcohol, which was then applied onto a backing layer 26 made of carbon to provide the reaction layer (air cathode) of Comparative Example 4.

Figure 10:
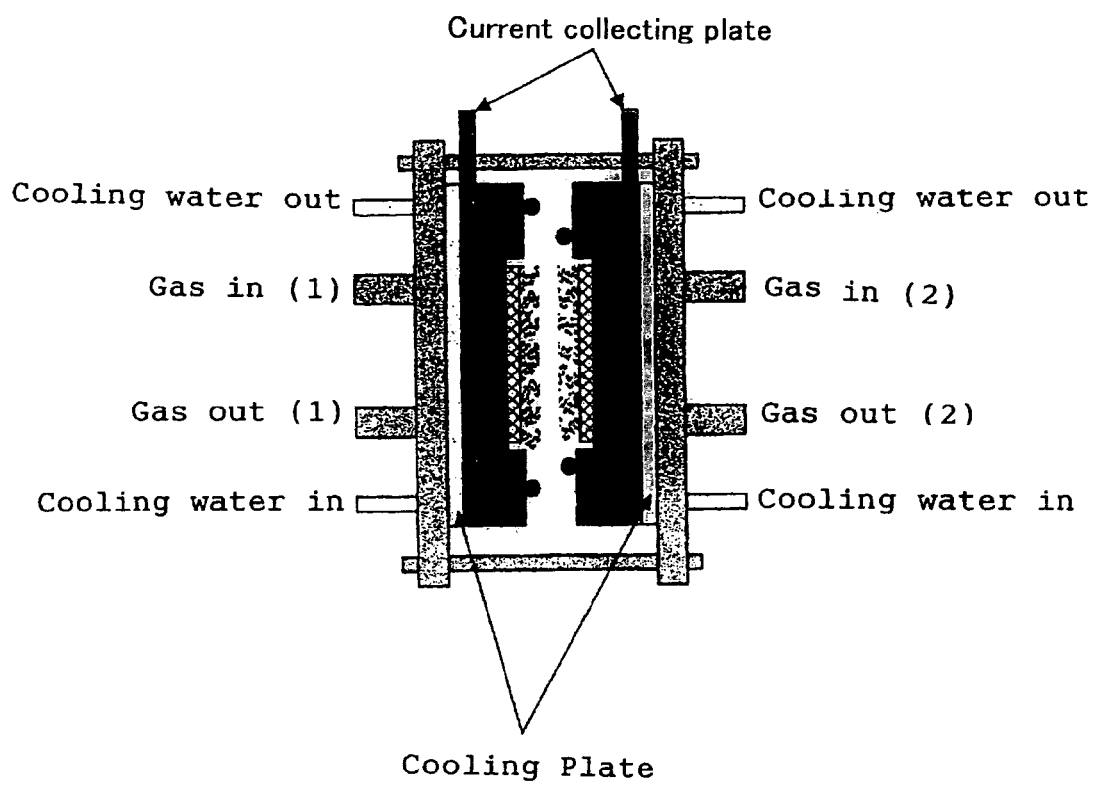
FIG. 10 is a cross-sectional view of an apparatus for measuring the characteristics of the fuel cell shown in FIG. 9.

The fuel cells of Examples 7-9 and Comparative Example 4 were set in the measuring apparatus 30 shown in FIG. 10 to measure the electrochemical surface areas of the cells. The following method of measurement was used.

First, to humidify the sample sufficiently, humidified nitrogen gas was introduced to the reaction layer 23 on the air cathode side and to the reaction layer 24 on the anode side.

Second, the supply of nitrogen gas was terminated and replaced with a hydrogen gas supply to electrochemically stabilize the platinum surface while applying 0.1-1.0 V, 50 mV/sec relative to the reference potential of the reaction layer on the anode side.

CO gas was then introduced to the reaction layer on the air cathode side while a potential of 0.3 V was maintained relative to the reference potential of the reaction layer on the anode side so as to absorb CO in the platinum. Next, while maintaining the potential, nitrogen gas was introduced to the reaction layer on the air cathode side to replace the CO in the reaction layer with nitrogen gas.

The CO absorbed in the platinum surface is electrochemically removed by oxidation. The electrochemical surface area of platinum was calculated from the electrical quantity required for the removal by oxidation. The equation below was used to calculate the electrochemical surface area. The test was conducted at 50° C.

Electrochemical surface area $(cm^2-Pt)$=electrical quantity required for oxidizing CO $(mC)/0.42$ $mC/cm^2-Pt$, wherein "mC is millicoulombs.

Table 1 shows the results of the test.

TABLE 1

Electrochemical surface areas

| | Comparative Example 4 | Example 7 | Example 8 | Example 9 |
|---|---|---|---|---|
| Pt surface area $(cm^2-Pt)/$ $(cm^2$-geometic) | 274 | 133 | 174 | 210 |
| Pt electrochemical surface area $(cm^2-Pt)/$ $cm^2$-geometic) | 17 | 139 | 163 | 179 |
| Efficiency of Utilization of platinum (%) | 6.3 | 104.5 | 93.7 | 85 |

In Table 1, the platinum surface area in each example was calculated from the amount of platinum on the electrodes and the platinum surface area as obtained from the catalyst particle size which in turn was measured by XRD. The electrochemical surface area was calculated from the quantity of electricity required for CO oxidization. The efficiency of utilization of platinum was obtained by dividing the electrochemical surface area of platinum by the platinum surface area.

The results of Table 1 clearly show that the supported platinum catalysts of the examples in accordance with the present invention have an electrochemical surface area of platinum even without an ion exchange resin (such as Nafion).

The apparatus shown in FIG. 10 was used to measure the characteristics of the fuel cell of Examples 7-9 and Comparative Example 4 at 50° C. by introducing hydrogen gas to the reaction layer on the anode side and air to the reaction layer on the air cathode side, at atmospheric pressure.

Figure 11:
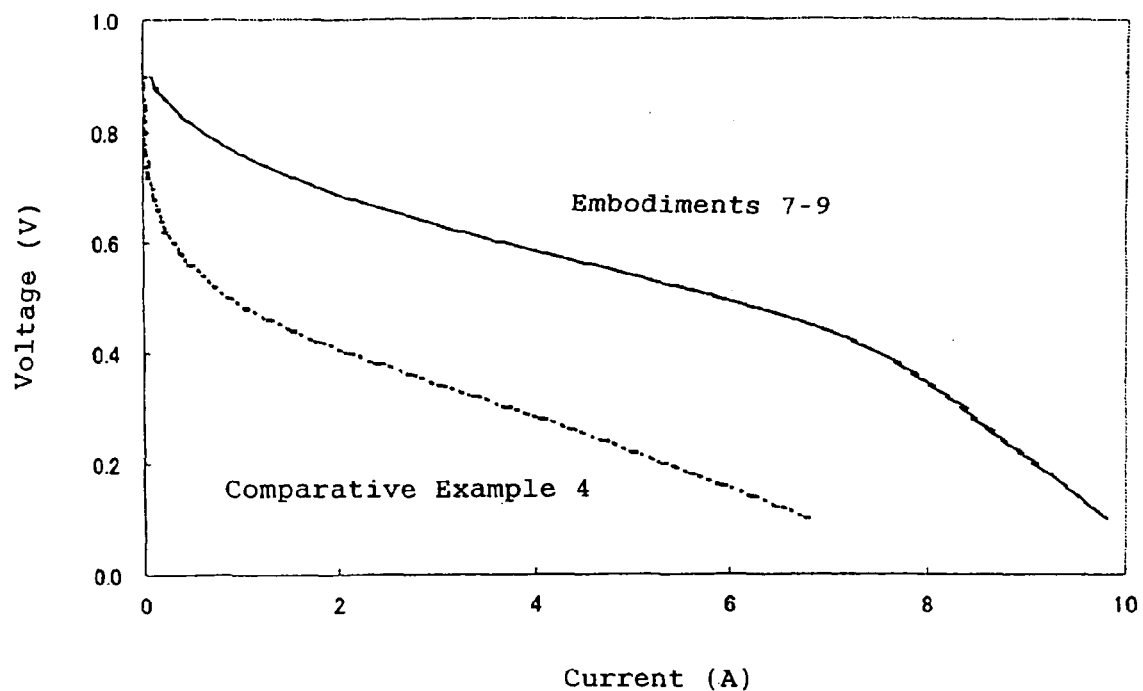
FIG. 11 is a chart comparing the characteristics of the fuel cells with reaction layers made of supported metal catalysts according to certain embodiments of the invention with those of a fuel cell with a reaction layer made of a supported metal catalyst without proton conductivity.

FIG. 11 shows the results of the measurement. The fuel cells that used the supported platinum catalysts of Examples 7-9 as the reaction layers exhibited desirable current-voltage characteristics, confirming their excellence in operation in fuel cells.

In the tests described above, the supported catalysts in the examples exhibited both proton conduction and electronic conduction at a low temperature, i.e. in a range of from room temperature (20° C.) to 60° C. While dependent on the presence of water, it is believed that the catalyst-supporting catalysts exhibit equivalent functions and characteristics up to 200° C. in an unhumidified atmosphere.

The foregoing experiments (examples) demonstrate that the supported platinum catalysts exhibit their desirable functions in fuel cells even in a low temperature range, in contrast to the conventional carrier supported, inorganic-based catalyst which exhibits its catalytic functions only at a high temperature of about 800° C.

Furthermore, as shown in FIG. 5, the electronic conductor phases (units) 7 are connected to the proton conductor phases (units) 9 by covalent bonding, so that they are very close to each other. Because of this, even if a catalyst particle is very small, the electron conductors 7 and the proton conductors 9 are both in contact with each catalyst particle simultaneously. This makes it possible to supply electrons and protons necessary for a catalytic reaction to the catalyst in proper quantities and thereby improve catalyst utilization efficiency and thus fuel cell utilization efficiency.

Other embodiments of catalyst-supporting carriers that can be used for the reaction layer of a fuel cell will be described hereinafter.

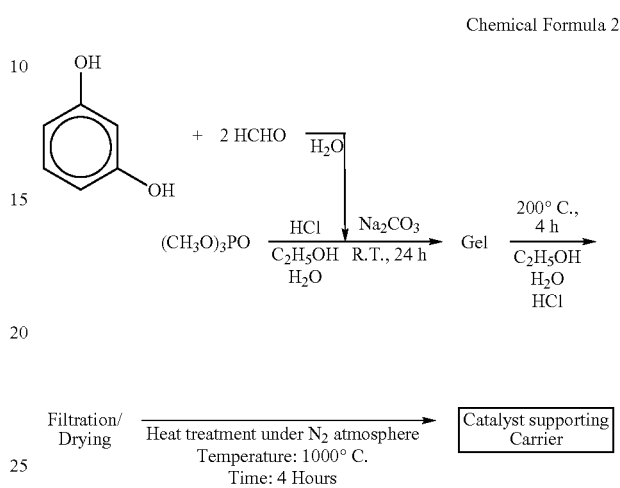

Chemical Formula 2

In accordance with Chemical Formula 2 above, resorcinol (5 g) was dissolved in pure water (20 ml) and formaldehyde (6.7 ml) was added thereto. Trimethyl phosphate (5.2 ml) was stirred in a mixed solution of pure water (3.2 ml), ethanol (10.5 ml), and hydrochloric acid (124 μl) for one hour to hydrolyze the trimethyl phosphate. The solution obtained by hydrolyzing trimethyl phosphate was added to the resorcinol/formaldehyde aqueous solution. $Na_2CO_3$(0.47 g) was then added and the resultant solution was left standing at room temperature for 24 hours to gelate.

Figure 12:
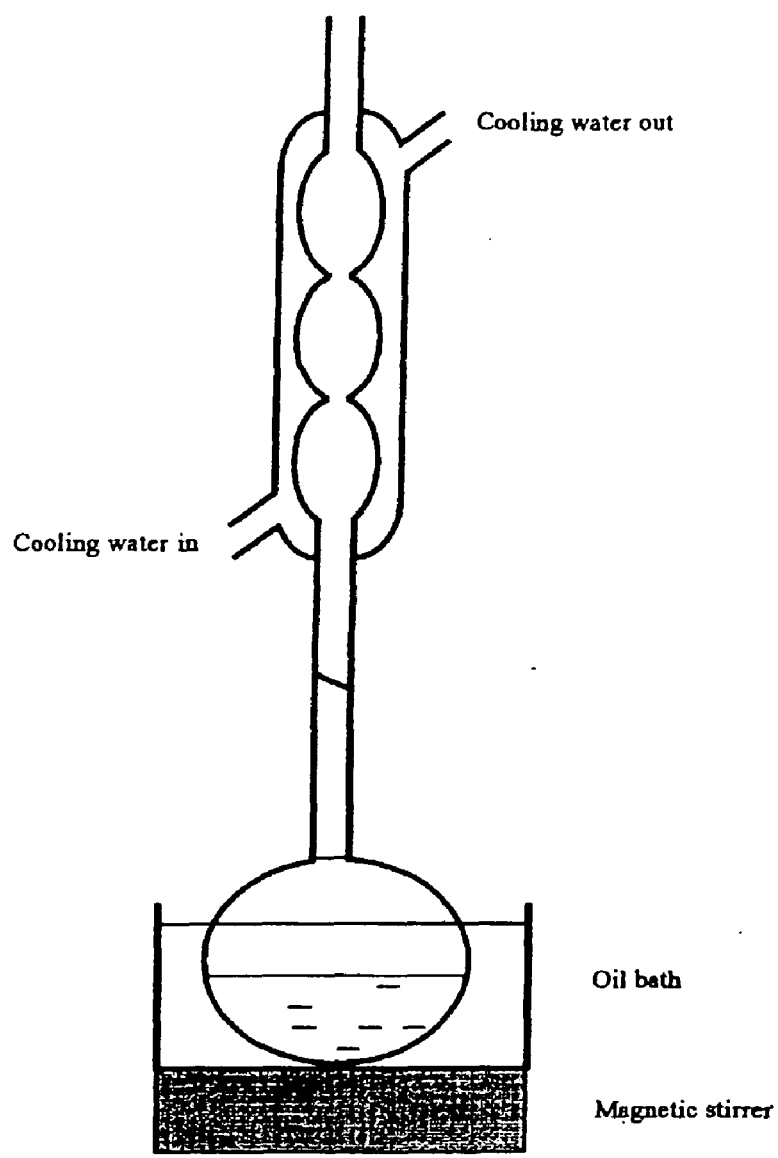
FIG. 12 is a schematic view of apparatus used in the method of the present invention, including a reflux condenser.

The resultant gel was ground and was refluxed in a mixed solution of trimethyl phosphate (5.2 ml), pure water (3.2 ml), ethanol (10.5 ml), and hydrochloric acid (124 μl) in an oil bath at a temperature of 200° C. for four hours. FIG. 12 shows the apparatus used for the refluxing. The supported catalyst of the embodiment was obtained by filtering, drying, and subjecting the resultant sample to heat-treatment in an inert atmosphere at 1000° C. for four hours.

The supported catalyst thus obtained was ground in a ball mill and formed into disk-shaped samples having a diameter of 15 mm and a thickness of about 3 mm using an SPS sintering machine. Each sample was interposed between Nafion membranes as well as catalyst layers to form a holder shown in FIG. 6. The resultant holder was placed in a container, and nitrogen gas and hydrogen gas at a temperature of 60° C. and a humidity of 100% were introduced into the container. A voltage was applied to the holder to obtain a response current. A voltage-current characteristic of the supported catalyst of Example 10 was determined from the response current (similar to that shown in FIG. 7). The proton conductivity was determined from this characteristic by calculation as $5.6 \times 10^{-3}$ S/cm. The amount of phosphorus in the sample (Pmol/Cmol) was 4.8% as determined by an EDX analyzer.

Another embodiment of a supported catalyst that can be used in the reaction layer of a fuel cell will now be described.

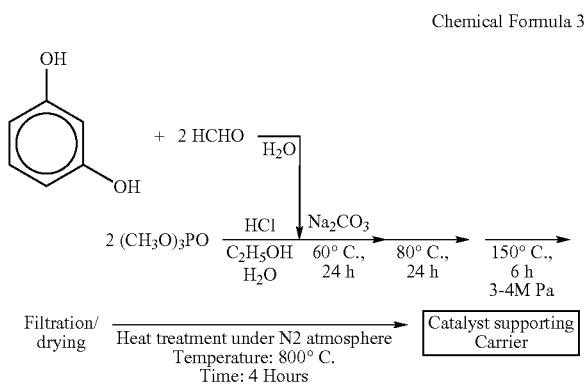

Chemical Formula 3

In accordance with Chemical Formula 3, resorcinol (2 g) and formaldehyde (2.7 ml) were dissolved in pure water (8 ml). Further, trimethyl phosphate (4.2 ml) was stirred in a mixed solution of pure water (2.6 ml), ethanol (5.0 ml), and hydrochloric acid (99 μl) for one hour to hydrolyze the trimethyl phosphate. The second solution was added to the first solution. $Na_2CO_3$ was then added, the solution was stirred at room temperature for three hours, then left standing at 60° C. for 24 hours, and then at 80° C. for 24 hours.

Figure 13:
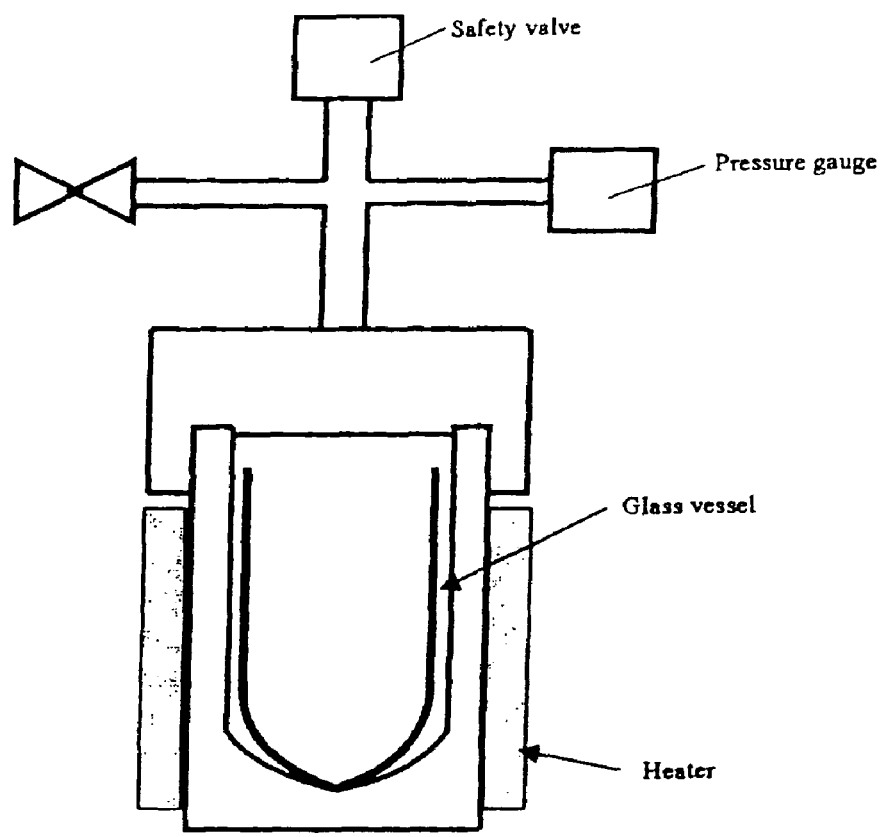
FIG. 13 is a schematic view of an autoclave used in another embodiment of the method of the present invention.

The sample was then heated in an autoclave having an internal space of 120 cc (see FIG. 13) at 150° C. for six hours. The internal pressure within the autoclave rose to about 3-4 MPa due to the self-developed pressure of the solvents.

The supported catalyst of this embodiment was obtained by filtering, drying, and subjecting the resultant sample to heat-treatment in an inert atmosphere at 800° C. for four hours.

The supported catalyst thus obtained was ground in a ball mill and pressure-formed into disk-shaped samples having a diameter of 15 mm and a thickness of about 3 mm using an SPS (spark plasma sintering) sintering machine. Each sample was interposed between Nafion membranes along with catalyst layers to form a holder as shown in FIG. 6. The holder was placed in a container, and nitrogen gas and hydrogen gas at a temperature of 60° C. and a humidity of 100% were introduced into the container. A voltage was applied to the holder to obtain a response current. A voltage-current characteristic of the supported catalyst of Example 11 was determined from the response current (similar to that shown in FIG. 7). The proton conductivity was determined from this characteristic by calculation as $1.5 \times 10^{-2}$ S/cm. The amount of phosphorus in the sample (Pmol/Cmol) was 5.8%. The phosphorus amount in this example was determined in the same manner as in Example 4.

Figure 14:
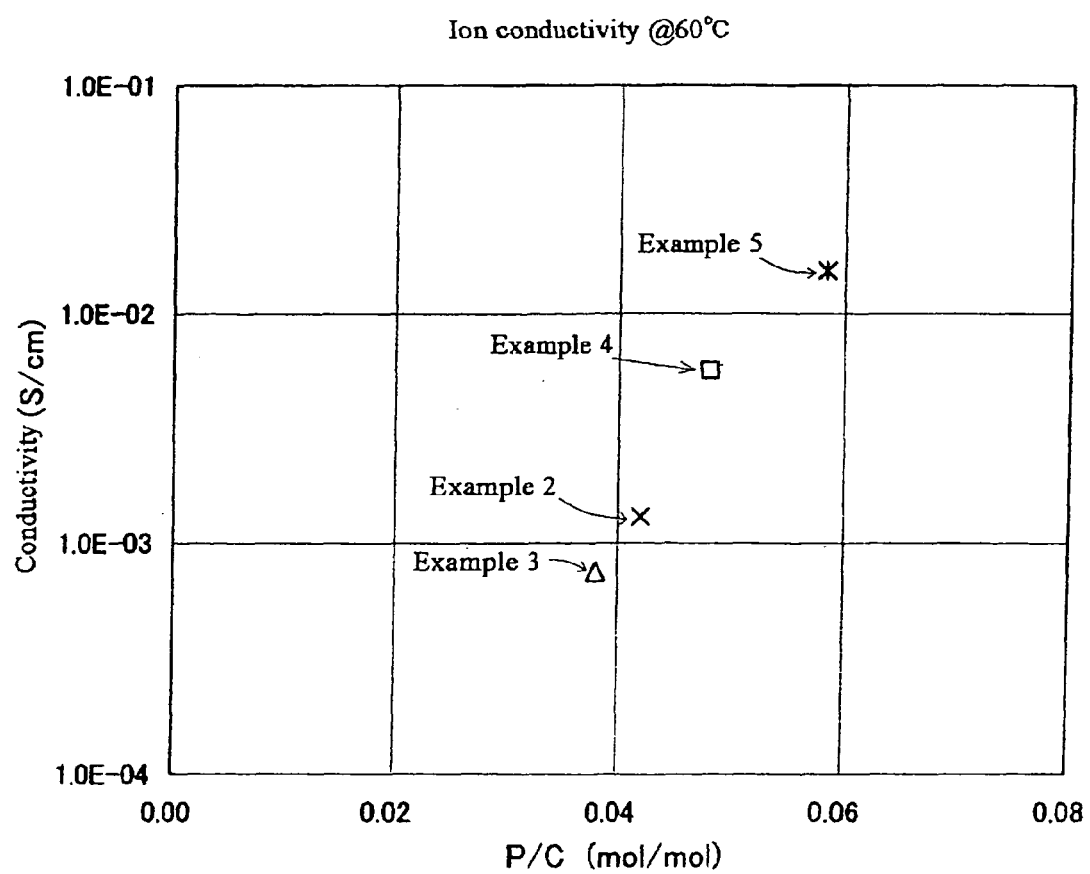
FIG. 14 shows the relationship between the proton conductivity and the amount of phosphorus in the mixed conductor of several embodiments of the present invention.

Table 2 below and FIG. 14 show the relationship between the phosphorus content and the proton conductivity of each of the catalyst-supporting carriers of the foregoing Examples.

TABLE 2

| | Example 2 | Example 3 | Example 10 | Example 11 |
|---|---|---|---|---|
| Pretreatment of precursors | | | 200° C. | autoclave |
| Heating temp (° C.) | 800 | 1000 | 1000 | 800 |
| Phosphorus content | 4.2% | 3.8% | 4.8% | 5.8% |
| Proton conductivity | $1.3*10^{-3}$ | $7.3*10^{-4}$ | $5.6*10^{-3}$ | $1.5*10^{-2}$ |

These comparisons demonstrate that heating or pressure-heating of precursors gives an increased phosphorus content and thus improved proton conductivity to the catalyst-supporting carrier obtained by the heat treatment.

Two grams of phenol were dissolved in a mixed solution of 5 cc of ethanol in 30 cc of pure water, to which 3.15 cc of a formaldehyde solution was then added. After 4.89 cc of a trimethyl phosphate solution was further added, the solution was stirred for one hour, and then 0.089 gram of sodium carbonate was added. The solution was then stirred at room temperature overnight. After the solution was left standing sealed at 70° C. for 24 hours, the solvent was removed. The resultant sample was subjected to heat treatment at 500° C. in a nitrogen gas atmosphere for 4 hours to obtain the supported catalyst of this example.

Two grams of pyrogallol were dissolved in 8 cc of pure water, to which 2.36 cc of a formaldehyde solution was then added. After 3.65 cc of a trimethyl phosphate solution was added, the solution was stirred for one hour, and then 0.0167 gram of sodium carbonate was added. The solution was then stirred at room temperature for three hours. After the solution was left at rest, sealed, at 50° C. for 24 hours, it was held sealed at 80° C. for 72 hours. The resultant gel was subjected to heat treatment at 800° C. in a nitrogen gas atmosphere for 4 hours to obtain the supported catalyst of this example.

Three grams of dihydroxybiphenyl were dissolved in 12 cc of a mixed solution of ethanol and water, with an ethanol/water volume ratio of 1/1, to which 4.84 cc of a formaldehyde solution were then added. After 7.49 cc of a trimethyl phosphate solution were added, the solution was stirred for one hour, and then 0.0683 gram of sodium carbonate was added. The solution was then stirred at room temperature for three hours. After the solution was held sealed and at rest at 50° C. for 24 hours, it was held sealed and at rest at 80° C. for an additional 72 hours. Upon evaporation of the solvent, the resultant sample was subjected to heat treatment at 500° C. in a nitrogen gas atmosphere for 4 hours to obtain the supported catalyst of this example.

Three grams of resorcinol were dissolved in 12 cc of pure water, to which 4.05 cc of a formaldehyde solution were then added. While stirring, 0.736 cc of an aqueous phosphate solution was gradually added. The solution was left sealed and standing at 70° C. for 24 hours, and the solvent was then removed. The resultant sample was subjected to heat treatment at 1000° C. in a nitrogen gas atmosphere for 4 hours to obtain the supported catalyst of this example.

Three grams of resorcinol were dissolved in 12 cc of pure water, to which 4.05 cc of a formaldehyde solution were then added. Then, 0.028 gram of sodium carbonate was added. After the solution was left standing sealed at 50° C. for 24 hours and then at 80° C. for 72 hours, the gel was ground. The ground gel was separately washed with a 0.1N hydrochloric acid solution, with pure water, and with ethanol in that order.

The washed gel was immersed in a solution of 1.5 gram of tungstophosphoric acid in 50 cc of ethanol. After being immersed at 50° C. for 48 hours, the gel was subjected to heat treatment at 700° C. in a nitrogen gas atmosphere for 4 hours to obtain the supported catalyst of this example.

Three grams of resorcinol were dissolved in 12 cc of pure water, to which 4.05 cc of a formaldehyde solution were then added. Added to this were a solution of 2.18 grams of phenylphosphonic acid in a mixture of ethanol and pure water, with an ethanol/pure water volume ratio of 1/1, and then 0.114 gram of sodium carbonate. After being stirred at room temperature for 12 hours, the solution was left standing at 60° C. for 24 hours and then at 80° C. for an additional 48 hours both in a sealed condition. The resultant sample gel was subjected to heat treatment at 800° C. in a nitrogen gas atmosphere for 4 hours to obtain the supported catalyst of this example.

Samples obtained in examples 12-17 were ground in a ball mill and were pressure-formed into disks having a diameter of 15 mm and a thickness of about 3 mm. To measure the electronic specific resistance of each sample, the sample was interposed between collector plates made of gold and a DC current was applied to produce a response voltage. The electronic specific resistance was obtained from the response voltage. To measure the ionic conductance of the obtained samples, each sample was interposed between Nafion membranes along with catalyst layers to form a holder as shown in FIG. 6. The holder was placed in a container, and nitrogen gas or hydrogen gas at a temperature of 60° C. and a humidity of 100% was introduced into the container. A voltage was applied to the holder. The ionic conductance was obtained from the response current.

The results are shown in Table 3.

TABLE 3

|  | Electronic specific resistance ($\Omega \cdot$ cm) | Proton conductance (S/cm) |
| --- | --- | --- |
| Example 12 | 10 | $7.1 \times 10^{-4}$ |
| Example 13 | 0.18 | $1.1 \times 10^{-2}$ |
| Example 14 | 50 | $5.3 \times 10^{-4}$ |
| Example 15 | 0.07 | $1.0 \times 10^{-3}$ |
| Example 16 | 0.14 | $1.5 \times 10^{-4}$ |
| Example 17 | 0.14 | $2.7 \times 10^{-3}$ |

As in Examples 1-3, the stability of these Examples exposed to water was confirmed by immersing 0.1 gram of each sample in pure water at room temperature and measuring the concentration of phosphorus in the immersed sample (the tungsten concentration in Example 12) over time. The concentrations of phosphorus (the tungsten concentration in Example 12) substantially stabilized after 50 hours of immersion. Even after 200 hours of immersion, with respect to the initial phosphorus concentration (the tungsten concentration in Example 12), 45%, 81%, 86%, 90%, 95%, 75% of phosphorus (or tungsten) remained in the samples in Examples 12, 13, 14, 15, 16, and 17, respectively.

In has now been discovered by the present inventor that a novel proton exchange membrane can be used to advantage as an element of a fuel cell as shown in FIG. 9, instead of Nafion (polymer proton exchange membrane). The new proton exchange membrane makes it possible to operate the fuel cell, especially the reaction layer, at 100 degrees C. or more, with effective use of the exhaust heat therefrom. The novel proton exchange membrane may be a membrane formed of an organic-inorganic hybridized compound including silicon alcoxide at the end thereof, an inorganic-organic hybridized material including a phosphate group, a grass system solid electrolyte such as $P_2O_5$—$Mo_x$, a proton exchange membrane made by impregnating phosphoric acid into a porous medium such as silicon carbide or a basic polymeric membrane.

The reaction layer is made in a same manner as shown in FIG. 9. In this manner, both the cathode and anode can be made without using an ion exchange membrane.

To provide an inorganic-organic hybridized membrane including phosphate groups, polyethylene glycol and 3-isociarate propyl triethoxysilane are reacted to form an inorganic-organic hybridized compound, and further reacted with a phosphate compound as a source of phosphoric acid.

The reaction layer and the backing layer are formed in the manner shown in FIG. 9.

The fuel cell can be operated at temperatures within a range from 100 degrees C. to 200 degrees C.

Alternatively, as the novel proton exchange membrane, a fuel cell may have a glass system solid proton exchange membrane. A metal oxide system solid proton exchange membrane (P2O5-Mox (M=Si, Ti, Zr, Al etc.) made by the sol-gel method is a glass system solid proton exchange membrane. To shape the glass system solid proton exchange membrane, the molding material in a sol state is molded or cast, followed by drying. The reaction layer and the backing layer are formed in the same manner as shown in FIG. 9. This fuel cell can also be operated at a temperature within a range from 100 degrees C. to 200 degrees C.

Figure 15:
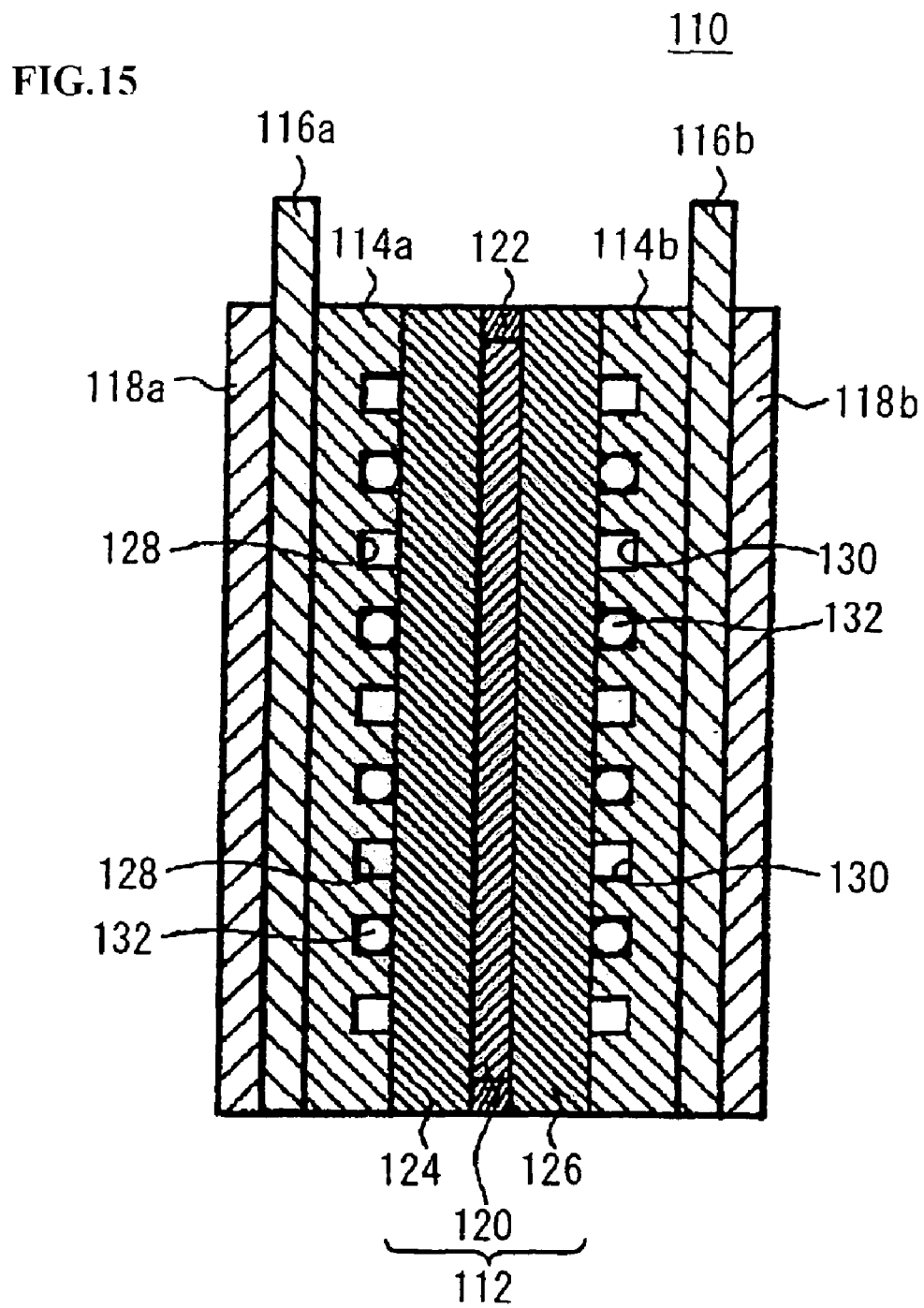
FIG. 15 shows the structure of a fuel cell of another embodiment of the present invention.

FIG. 15 shows a phosphoric-acid fuel cell system including, as a reactive layer, a supported metal catalyst. The phosphoric-acid fuel cell system 110 includes a fuel cell 112, separators 114a, 114b and power collecting electrodes 116a, 116b. The fuel cell 112 comprises a proton exchange membrane, reactions layers and backing layers. The separators 114a, 112b are disposed on opposing sides of the fuel cell 112 and are bipolar plates. The power collecting electrodes 116a, 116b are disposed on outer sides of the separators 114a and 114b, respectively. End plates 118a and 118b are disposed on outer sides of the power collecting electrodes, respectively, and the end plates 118a and 118b are tightened together by bolts (not shown). The fuel cell 112 comprises an electrolyte matrix layer 120 of porous silicon carbide containing phosphoric acid groups, and the reaction-backing layers 124, 126 are disposed on each side of the electrolyte matrix layer 120 by interposing a frame-like spacer 122. The supported platinum catalyst of the Example 4 is dispersed in a mixed liquid comprising pure water, a PTFE liquid dispersion and alcohol and then coated onto a carbon backing layer to produce the reaction-backing layers 124 and 126. A first gas path 128 for flow of hydrogen gas is formed in the separator 114a on the surface facing the reaction-backing layer 124. Likewise, a second gas path 130 for flow of air is formed in the separator 114b on the surface facing the reaction-backing layer 126.

The phosphoric-acid fuel cell thus constructed can be operated with its reaction layer at a temperature within a range from 100 degrees C. to 200 degrees C.

The present invention is not limited at all by the embodiments and the description of the embodiments. The present invention also contains various changes and modifications thereto without departure from the description of claims which follow in a range that can be easily attained by a person having ordinary skill in the art.

I claim:

1. A fuel cell including a reaction layer comprising a catalyst carrier formed of a compound containing inorganic electron conductor units and inorganic proton conductor units together formed in its molecular structure and a catalyst supported on the catalyst carrier.

2. The fuel cell according to claim 1, wherein said electron conductor units are obtained by carbonizing at least one carbon source selected from the group consisting of aliphatic hydrocarbons, aromatic hydrocarbons and derivatives thereof.

3. The fuel cell according to claim 2, wherein said carbon source is at least one member selected from the group consisting of polyacetylene, resorcinol, phenol, phenylphenol, polyaniline, polypyrrole, polythiophene, phenylphosphonic acid, phenylsilane alkoxide, pyrogallol, and dihydroxybiphenyl.

4. The fuel cell according to claim 1, wherein said electron conductor units are formed from a carbonaceous material.

5. The fuel cell according to claim 1, wherein said proton conductor units are formed from at least one member selected from the group consisting of phosphorus-containing compounds, sulfur-containing compounds, carboxylic acids, boric acid, and inorganic solid-state acids.

6. The fuel cell according to claim 1, wherein said electron conductor units have consecutive carbon-carbon bonds including carbon-carbon double bonds.

7. The fuel cell according to claim 1, wherein said catalyst is a noble metal.

8. A fuel cell having a reaction layer containing a catalyst support comprising electron conductor units made of an inorganic material obtained by carbonizing an organic material fixed to proton conductor units made of an inorganic material.

9. The fuel cell according to claim 8, wherein the electron conductor units are fixed to the proton conductor units by covalent bonding.

10. The fuel cell according to claim 8, wherein the proton conductor units are fixed to the electron conductor units by intercalation.

11. The fuel cell according to claim 8, wherein the proton conductor units are fixed to the electron conductor units by inclusion.

12. The fuel cell according to claim 5, wherein the reactive layer operates at a temperature within a range from about 100 degree C. to about 200 degree C.

13. A method for producing a reaction layer wherein the reaction layer comprises a catalyst carrier formed of a compound containing inorganic electron conductor units and inorganic proton conductor units together formed in its molecular structure and a catalyst supported on the catalyst carrier for a fuel cell comprising:

forming a high molecular weight precursor by mixing and polymerizing at least one carbon source selected from the group consisting of aliphatic hydrocarbons, aromatic hydrocarbons and derivatives thereof, with a proton conducting material;

pyrolizing the high molecular precursor to obtain an inorganic polymer;

supporting a catalyst on the inorganic polymer to form a supported catalyst; and joining the supported catalyst to a proton exchange layer.

14. The method according to claim 13, wherein said carbon source is at least one member selected from the group consisting of polyacetylene, resorcinol, phenol, phenylphenol, polyaniline, polypyrrole, polythiophene, phenylphosphonic acid, phenylsilane alkoxide, pyrogallol, and dihydroxybiphenyl.

15. The method according to claim 13, wherein said proton conducting material contains at least one member selected from a group consisting of phosphorus-containing compounds, sulfur-containing compounds, carboxylic acids, boric acid, and inorganic solid-state acids.

16. A method for producing a reaction layer wherein the reaction layer comprises a catalyst carrier formed of a compound containing inorganic electron conductor units and inorganic proton conductor units together formed in its molecular structure and a catalyst supported on the catalyst carrier for a fuel cell comprising:

forming a high molecular weight precursor by polymerizing at least one carbon source selected from the group consisting of aliphatic hydrocarbons, aromatic hydrocarbons and derivatives thereof to form a polymer; and introducing a proton conducting material into said precursor;

pyrolizing the precursor to form an inorganic polymer;

supporting a catalyst on the inorganic polymer to form a supported catalyst; and joining the supported catalyst to a proton exchange layer.

17. The method according to claim 16, wherein said carbon source is at least one member selected from the group consisting of polyacetylene, resorcinol, phenol, phenylphenol, polyaniline, polypyrrole, polythiophene, phenylphosphonic acid, phenylsilane alkoxide, pyrogallol, and dihydroxybiphenyl.

18. The method according to claim 16, wherein said proton conducting material contains at least one member selected from the group consisting of phosphorus-containing compounds, sulfur-containing compounds, carboxylic acids, boric acid, and inorganic solid-state acids.

19. A method of producing a reaction layer wherein the reaction layer comprises a catalyst carrier formed of a compound containing inorganic electron conductor units and inorganic proton conductor units together formed in its molecular structure and a catalyst supported on the catalyst carrier for a fuel cell comprising:

binding or mixing an organic compound with a compound having mobile protons to obtain a high polymer weight precursor;

carbonizing said high polymer weight precursor to form an inorganic polymer as a catalyst carrier;

supporting a catalyst on the catalyst carrier to form a supported catalyst; and joining the supported catalyst to a proton exchange layer.

* * * * *

UNITED STATES PATENT AND TRADEMARK OFFICE
CERTIFICATE OF CORRECTION

PATENT NO. : 7,776,477 B2 Page 1 of 1
APPLICATION NO. : 11/587982
DATED : August 17, 2010
INVENTOR(S) : Norifumi Hasegawa It is certified that error appears in the above-identified patent and that said Letters Patent is hereby corrected as shown below:

Column 17, line 40 (claim 13, line 12), ""high molecular precursor" should read
-- high molecular weight precursor --.

Signed and Sealed this

Sixteenth Day of November, 2010

David J. Kappos
*Director of the United States Patent and Trademark Office*